United States Patent [19]

Johnson et al.

[11] Patent Number: 4,814,046
[45] Date of Patent: Mar. 21, 1989

[54] PROCESS TO SEPARATE TRANSURANIC ELEMENTS FROM NUCLEAR WASTE

[75] Inventors: Terry R. Johnson, Wheaton; John P. Ackerman, Downers Grove; Zygmunt Tomczuk, Orland Park; Donald F. Fischer, Glen Ellyn, all of Ill.

[73] Assignee: The United States of America as represented by the United States Department of Energy, Washington, D.C.

[21] Appl. No.: 217,916

[22] Filed: Jul. 12, 1988

[51] Int. Cl.$^4$ .................... C22B 60/02; G21C 19/42; G21C 1/24; C01G 57/00

[52] U.S. Cl. .................................. 204/1.5; 252/626; 252/627; 252/628; 75/84.1 R; 75/84.1 A; 376/311; 376/358; 420/1; 420/2; 420/3; 420/590; 423/3; 423/5; 423/21.1; 423/250; 423/251

[58] Field of Search .............. 252/626, 627, 628; 423/3, 5, 250, 249, 251; 75/84.1 R, 84.1 A; 376/311, 358; 420/1, 2, 3, 4, 590, 591, 575, 523, 553, 498; 204/1.5

[56] References Cited

U.S. PATENT DOCUMENTS

| | | | |
|---|---|---|---|
| 3,147,109 | 9/1964 | Knighton et al. | 75/84.1 R |
| 3,271,133 | 9/1966 | Knighton et al. | 75/84.1 R |
| 3,282,681 | 11/1966 | Knighton et al. | 75/84.1 R |
| 3,284,190 | 11/1966 | Knighton et al. | 75/84.1 R |
| 3,460,917 | 8/1969 | Long | 423/3 |
| 4,012,480 | 3/1977 | Delvalle | 423/6 |
| 4,036,637 | 7/1977 | Anderson et al. | 75/84.1 R |
| 4,072,506 | 2/1978 | Megy | 75/84.1 R |
| 4,217,171 | 8/1980 | Shaffer | 376/311 |
| 4,237,100 | 12/1980 | Delvalle | 423/6 |
| 4,338,215 | 7/1982 | Shaffer et al. | 252/628 |
| 4,464,344 | 8/1984 | Saikkonen | 423/5 |

OTHER PUBLICATIONS

Burris, "Rekindled Interest in Pyrometallurgical Processing", Chemical Engineering Progress, pp. 35–39 (Feb. 1986).

Niedrach et al., 1956, Electrorefining for Removing Fission Products from Uranium Fuels, Industrial and Engineering Chemistry, vol. 48(6):977–981.

*Primary Examiner*—Howard J. Locker
*Attorney, Agent, or Firm*—James W. Weinberger; Thomas G. Anderson; Judson R. Hightower

[57] ABSTRACT

A process for removing transuranic elements from a waste chloride electrolytic salt containing transuranic elements in addition to rare earth and other fission product elements so the salt waste may be disposed of more easily and the valuable transuranic elements may be recovered for reuse. The salt is contacted with a cadmium-uranium alloy which selectively extracts the transuranic elements from the salt. The waste salt is generated during the reprocessing of nuclear fuel associated with the Integral Fast Reactor (IFR).

10 Claims, 2 Drawing Sheets

PROCESS TO SEPARATE TRANSURANIC ELEMENTS FROM NUCLEAR WASTE

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

The invention relates to a pyrometallurgical process for the reprocessing of irradiated nuclear power reactor fuel elements. More specifically, the invention relates to a pyrometallurgical process for the separation of the transuranic elements from fission product elements. Still more specifically, the invention relates to an improved pyrometallurgical process for the separation of the transuranic elements, neptunium, plutonium, americium and curium, from certain fission product elements, the lanthanide elements and yttrium, contained in a fused salt waste solution.

The disposal of radioactive waste which results from the reprocessing of irradiated nuclear power reactor fuel elements is one of the major problems facing the nuclear power industry today. One approach is to solidify the radioactive waste as it comes from the reprocessing facility into a stable solid material which can be stored in the earth for a period of time sufficient for the radiation to decay to acceptable levels. However, storage times required for spent reactor fuels to achieve such levels of radioactivity are on the order of one million years. This is far longer than the geologic stability of a waste repository can be expected to be maintained. One solution is to remove the extremely long-lived or very hazardous radioactive components, such as the transuranic elements neptunium, plutonium, americium and curium from the wastes so that the remaining radioactive elements, representing the bulk of the radioactive waste, need only be stored for up to 1,000 years before the radio-activity decays to radioactive levels of the uranium used in making the original fuel. It is reasonable to ensure the integrity of a repository for 1,000 years. The actinides thus recovered from the waste can then be reprocessed and recycled to provide additional fuel for nuclear reactors and for isotopic power sources.

A solution to the problem of the disposal of highly radioactive nuclear waste is suggested in an article entitled "Rekindled Interest in Pyrometallurgical Processing", Chemical Engineering Progress, p. 35 (Feb. 1986). Described therein is a reactor concept called the Integral Fast Reactor (IFR). The IFR is a complete, self-contained, sodium-cooled, pool-type fast reactor fueled with a metallic alloy of uranium, plutonium and zirconium, and is equipped with a close-coupled fuel cycle.

Close-coupling of the reactor and the fuel cycle facilities is achieved by locating the reactor and the reprocessing, fuel refabrication, and management of fission product wastes on one site. With this arrangement, it is not necessary to ship fuel to or from the reactor site. As conceived, fission product wastes would be processed and stored on site for long periods of time, perhaps the life of the reactor, before shipment to a waste repository for ultimate disposal.

A pyrometallurgical process utilizing electrorefining for purification of the core fuel has been developed to reprocess the reactor fuel. In this process, the chopped fuel rods are dissolved, or transferred by anodic dissolution, to molten cadmium contained in the low-carbon steel container of the electrorefining cell. The container and cadmium become the positive electrode (anode) of a electrolytic cell. Above the cadmium is a fused molten salt electrolyte made up of chloride salts having high chemical stabilities, e.g. LiCl, KCl, NaCl, $BaCl_2$ and $CaCl_2$. The negative electrode (cathode) is a metal rod or a pool of liquid cadmium in a nonconducting container that extends from the top of the electrorefining cell into the electrolyte to within a short distance from the surface of the cadmium. Small amounts of uranium and plutonium are placed into the electrolyte by oxidizing them chemically from the cadmium solution.

Application of an appropriate voltage across the electrodes transfers uranium and plutonium from solution in the cadmium to the cathode, leaving noble metals behind in the anode. Rare earth, alkaline earth, and alkali metal fission products remain in the salt as do a small quantity of the transuranic elements. The cathode deposits are subsequently removed from the electrorefining cell and melted to effect separation from adhering electrolytic salt. After final adjustments of the alloy composition are made, the alloy product is cast into fuel pins, which become fresh fuel for the IFR.

Disposal of the electrolyte remains a problem because it contains small amounts of long-lived transuranic elements, in addition to the shorter-lived fission product elements.

The current proposed process for treating the waste IFR salt does not recover the contained actinides, but converts the wastes into more readily disposable forms. The waste salt is contacted with a cadmium-lithium alloy, a strong reductant, to transfer nearly all of the actinides from the salt into the metal phase. This also results in most of the rare earth fission products being transferred into the metal phase. The treated salt is dispersed in a cement matrix that is cast into corrosion-resistant metal containers. This waste is highly radioactive because it contains fission product cesium and strontium, but it may not require disposal in a deep geologic repository because it does not contain significant amounts of transuranic elements. The cadmium-lithium alloy that contains the actinides and rare earths extracted from the salt is combined with other metal wastes. The mixture is retorted to vaporize the cadmium and leave a metallic residue consisting of fission products, small amounts of actinides, zirconium from the fuel alloy and fuel cladding hulls. This residue is combined with a metal powder, such as copper, and pressed into a solid ingot. The metal matrix is encapsulated in a corrosion resistant container and, because it contains small, but significant amounts of TRU elements, it must be buried in a geologic repository.

One of the long term goals of the IFR is to produce only non-TRU wastes. However, clean separations of TRU elements, especially americium and curium, from the rare earths are difficult to achieve by any known chemical or pyrochemical technique. Therefore, what is needed, is a process compatable with the above described electrochemical process, which will provide a nearly quantitative separation of the transuranic (TRU) elements from the fused electrolyte salt, so that the amount of TRU-contaminated waste which must be disposed of can be greatly reduced or eliminated altogether.

SUMMARY OF THE INVENTION

It has been discovered that, by replacing the lithium metal in the molten cadmium with uranium metal, the resulting alloy will act as an extractant which will separate the transuranic elements from the molten salt more effectively than the rare earths fission product elements, thereby separating the TRU elements, especially americium and curium, from the rare earths fission products. As used herein, the phrase; "rare earth fission product values" includes yttrium and the lanthanide fission product elements while the phrase; "transuranic values", or TRU elements includes neptunium, plutonium, americium and curium values. The invention is a pyrochemical process for recovering transuranic values from rare earth values when both values are contained, together with other fission product values, in a fused chloride salt, by contacting the molten salt with a molten extractant alloy of cadmium metal and uranium, whereby the transuranic values are preferentially taken up by the extractant alloy, while the rare earth values remain in the molten salt and separating the extractant alloy from the molten salt, thereby separating the transuranic values from the rare earth values.

The transuranic elements can then be readily separated from the cadmium-uranium extractant and added back into the uranium-plutonium-zirconium alloy to be fabricated into fresh fuel, while the rare earths fission products may be separated from the fused salt waste, processed and sent to storage.

The cadmium-uranium extractant alloy can also be used to recover plutonium from the molten salt during the reprocessing of irradiated nuclear fuel elements. The extractant alloy containing the plutonium, because it is compatable, can then be added directly into the molten cadmium anode of the electrorefining cell to continue the recovery process.

It is therefore one object of the invention to provide a process for recovering plutonium from a fused chloride salt.

It is another object of the invention to provide a process for recovering transuranic elements from a fused chloride salt.

It is still another object of the invention to provide an improved process for separating transuranic elements from rare earth and other fission product elements.

It is a further object of the invention to provide a process for separating transuranic elements from rare earth fission product elements contained in a fused chloride electrolyte salt.

Finally, it is the object of the invention to provide a process for the separation of transuranic elements from a fused chloride electrolyte salt containing these together with rare earth fission products so that the waste salt does not have to be stored as a high level waste.

DETAILED DESCRIPTION OF THE INVENTION

Figure 1:
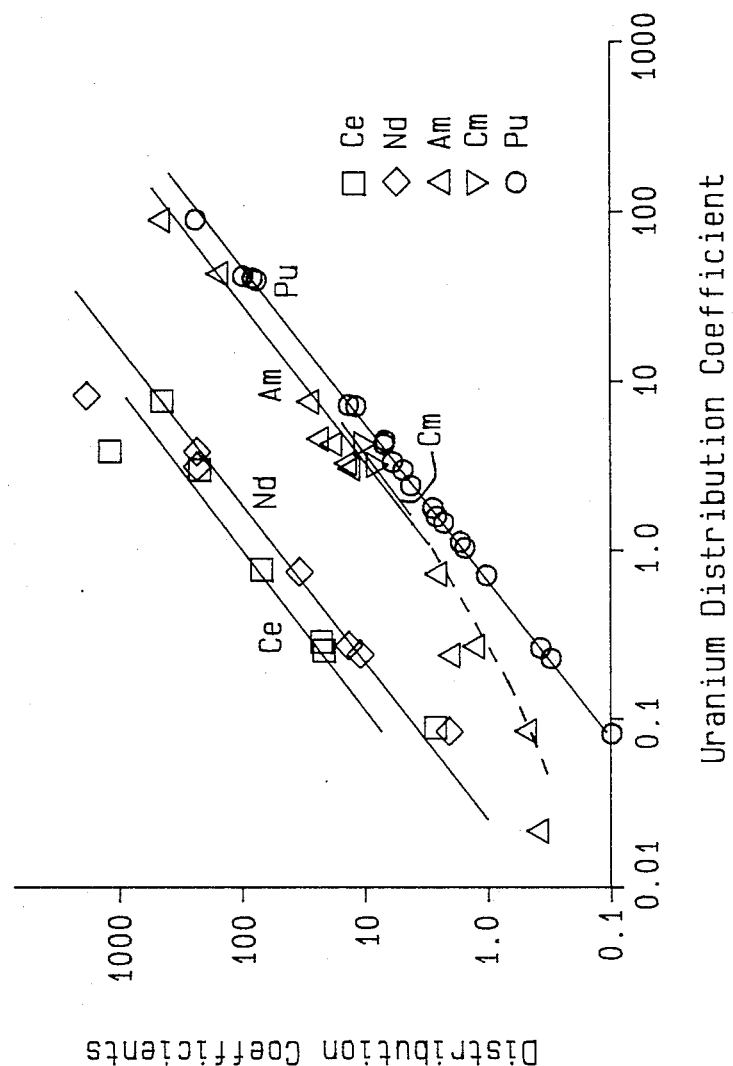
FIG. 1 is a series of curves showing the distribution ratios of several lanthanide and actinide elements in a system of a molten chloride salt and cadmium-uranium alloys having increasing uranium distribution coefficients.

These and other objects of the invention for recovering transuranic values from rare earth fission produce values when these values are contained together in a fused chloride salt may be met by contacting the salt in a molten state with a molten extractant alloy of cadmium containing about 2.3 wt % uranium at a temperature of about 500° C, wherein the salt has a composition of about 45 wt % lithium chloride and about 55 wt % potassium chloride and contains about 0.56 wt % uranium, the weight ratio of salt to extractant is about 1:5, and the distribution coefficient of uranium between the salt and the alloy after equilibration is between 0.5 and 5.0, whereby the transuranic values are preferentially taken up by the extractant alloy while the rare earth elements preferentially remain in the salt, and separating the extractant alloy from the salt, thereby separating the transuranic values from the rare earth fission product values.

The fused salt is a mixture of alkaline earth or alkali metal chlorides, except beryllium and magnesium, that has a low melting temperature and in which chlorides of the rare earth fission products and the transuranic elements have high solubilities. The salt then is a mixture of one or more chlorides of lithium, sodium, potassium, calcium, strontium, and barium that are thermodynamically more stable than rare earth and actinide chlorides. For example, a salt consisting of about 23 wt % LiCl, about 35 % $BaCl_2$, about 32 % $CaCl_2$ and about 10 % NaCl, and a eutectic mixture of KCl and 44 % LiCl have been found to be satisfactory. However, any number of different combinations of chloride salts meeting the above criteria will be satisfactory.

The molten chloride salt, as it comes from the IFR reprocessing cycle, will contain rare earth values and transuranic values, some strontium and cesium and other metal values. The salt will also contain a small quantity of uranium, generally from 0.1 to 0.6 wt %.

The extractant alloy is molten cadmium metal containing from about 0.5 to about 2.3 wt % uranium. The solubility of uranium in the cadmium depends upon the temperature of the molten cadmium metal. For example at 500° C., cadmium is saturated with about 2.3 wt % uranium. Preferably the extractant will contain from about 1.5 to 2.0 wt % uranium in order to obtain the best results since the uranium concentration in the metal affects the distribution ratios of the rare earth and transuranic values.

The temperature must be at least above the melting temperature of the extractant alloy and the salt and below the temperature at which the components begin to vaporize. The temperature may vary from about 450° C., depending on salt composition to about 600° C. Generally, a temperature of about 500° C. has been found satisfactory.

Contact times are not critical, since the reaction proceeds rapidly once contact between the salt and metal phases has been made. The actual extraction operation can be carried out as a batch or continuous operation, using, for example simple mixing tanks, mixer settlers, cocurrent or countercurrent flow columns, centrifical contractors or similar conventional type equipment known to those skilled in the art.

It is important that the system, i.e. the waste salt and the extractant contain sufficient uranium to replace the transuranic values and other values which will be extracted from the salt into the extractant phase in order to establish equilibrium. The uranium may be present in the extractant alone, or as is most generally the case, in both the extractant and the salt.

Of critical importance to the separation of the transuranic values, particularly americium, is the distribution coefficient of uranium between the salt phase and the extractant phase once equilibrium has been established between the two phases. As used herein, distribution coefficient is the weight percent of an element in the salt divided by the weight percent of that element in the metal phase. Referring to FIG. 1, it can be seen that when the uranium distribution coefficient is lower than about 0.5, the americium line begins to curve away from the other transuranic elements and toward the rare earth values, increasing the difficulty of separating the americium from the rare earth values. Distribution coefficients greater than about 100 will require greater quantities of extractant metal which must later be processed to recover the transuranium values. Thus, the uranium distribution coefficient between the salt and extractant after equilibration may range from about 0.1 to 100 with a preferred range of about 0.5 to 5.0.

Figure 2:
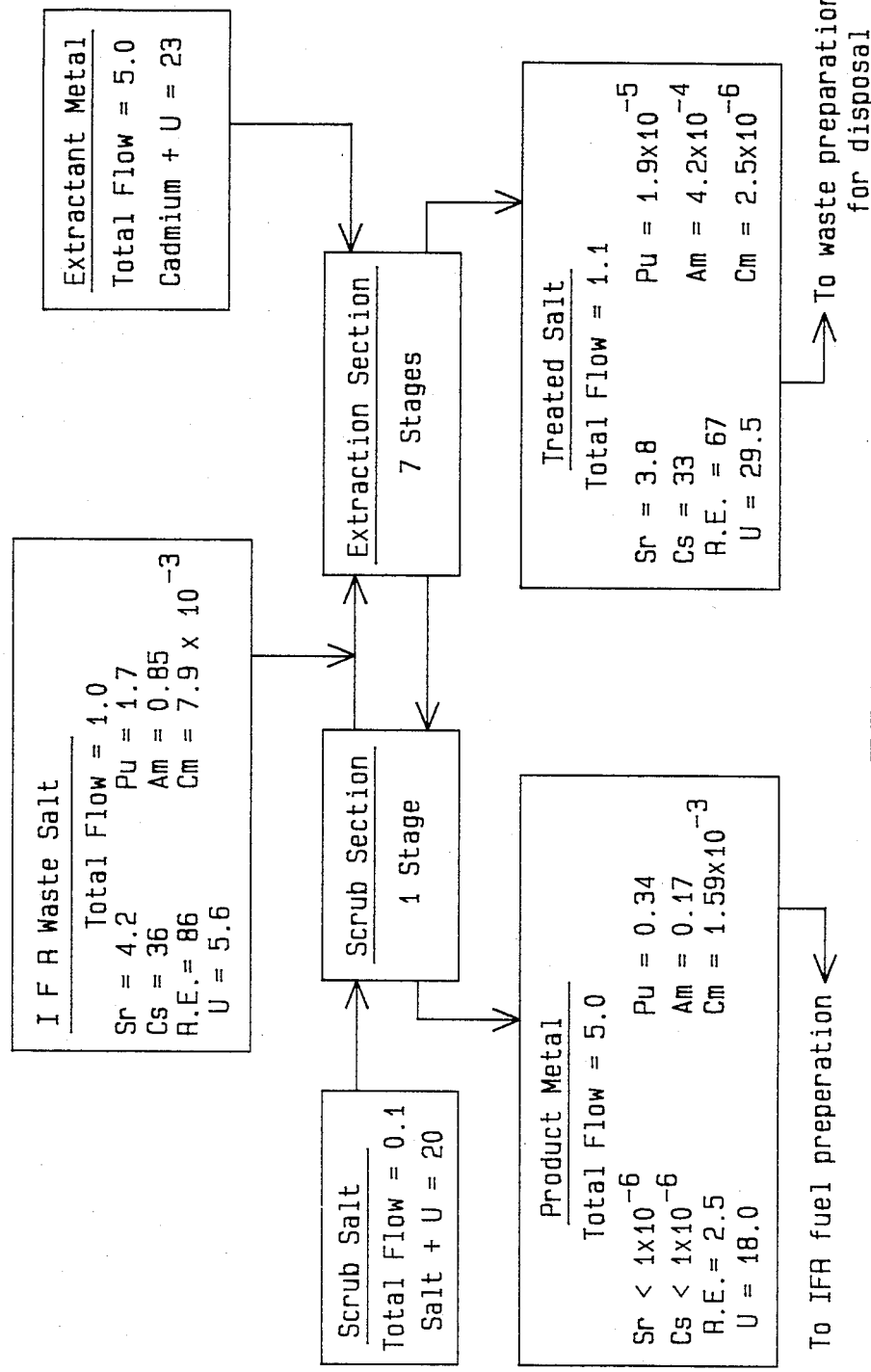
FIG. 2 is a flow diagram of a conceptional process for treating waste salt resulting from the processing of Integral Fast Reactor fuel to produce a waste salt containing very small amounts of transuranic elements.

A uranium distribution ratio within this preferred range would be attained when the anticipated IFR waste salt composition as shown in FIG. 2 is contacted with the cadmium extractant metal contains about 2.0 wt % uranium. Should the IFR waste salt contain transuranic and/or rare earth concentrations very much higher than those shown, it may be necessary to add more uranium metal to the cadmium to ensure that the uranium distribution, after equilibrium is established is within the desired range. The amount of additional uranium can be readily ascertained by those skilled in the art.

The weight ratio of salt to extractant and the number of extraction stages will depend to some extent on the degree of separation desired and the purpose of the extraction process. For example, a high degree of separation of transuranic elements from the salt is desirable in order to produce a nontransuranic waste salt for disposal. In addition, it is desirable to leave a large fraction of the rare earth fission products in the salt so that the concentrations of these elements in the fuel returned to the reactor will be low. To achieve these requirements in the example shown in FIG. 2, requires a salt to extractant ratio of about 1:5 and seven extraction stages plus one scrub stage. These conditions reduce the transuranic values in the waste salt from about 2.577 g/kg down to about $4.4 \times 10^{-4}$ g/kg, and leave more than 85% of the rare earth values in the salt.

The process of the invention is also suitable for the recovery of a large fraction of plutonium from the IFR waste salt so it can be recycled back into the fuel cycle. In this situation, two contact stages would be adequate with a total volume ratio of salt to extractant of 1:2. Under the conditons, this process would recover almost 73% of the plutonium originally contained in the waste.

In a similar manner, rare earth elements can be separated from transuranic elements contained in a molten cadmium alloy by preferentially extracting the rare earths into a salt containing uranium chloride.

Recovery of the transuranic elements from the extractant metal can be attained by heating the extractant to temperatures sufficient to vaporize the cadmium metal, above about 650° C. The resulting transuranic values and uranium can then be recycled to the fuel fabrication process for incorporation into the fuel elements.

The following examples are given as illustrations of the process of the invention and are not to be taken as limiting the scope or extent of the invention. The experiments described in Examples I, II and III are similar to experiments that have been conducted, but they do not correspond exactly to specific experiments. They represent a composite of data that have been collected over many experiments.

EXAMPLE I

The distributions of selected actinide and rare earth elements between liquid cadmium alloys and molten chloride salts were measured in a series of experiments in which a 15-cm diameter steel crucible, 30 cm deep, was used to contain about 15.6 kg of cadmium and 4.5 kg of a mixture of 33 wt % $BaCl_2$, 32 % $CaCl_2$, 25% LiCl, and 10% NaCl at 500° C.

To start a typical sequence of experiments, 250 g uranium, 120 g cerium, 187 g neodymium, and 13 g yttrium were dissolved in the cadmium metal phase. The addition of $CdCl_2$ oxidized some of the dissolved metals, which transferred to the salt phase as chlorides. The equilibrium concentrations are given in Table 1 below. As used herein, separation factors are defined as the distribution coefficient of an element divided by the distribution coefficient of uranium in the same salt-metal system.

TABLE 1

|  | U | Nd | Ce | Y |
|---|---|---|---|---|
| Salt Phase | 2.90 wt % | 4.0 | 2.6 | 0.28 |
| Metal Phase | 0.76 | 0.030 | 0.011 | <0.001* |
| Dist. Coef. | 3.8 | 130 | 240 |  |
| Sep. Factors (relative to uranium) |  | 35 | 62 |  |

*conc. in metal phase below detection limit

EXAMPLE II

The addition of 28 g of plutonium metal, which contained 2.90 mg of americium, to the experiment described in Example I caused the uranium and lanthanides to redistribute between the salt and metal phases. The plutonium metal reduced some of the uranium and lanthanide chlorides causing them to transfer to the cadmium phase and an equivalent amount of the plutonium to be dissolved in the salt phase as the chloride. After equilibrium among the dissolved species in the salt and metal phases was re-established, the concentrations were determined as given in Table 2.

TABLE 2

|  | U | Pu | Am+ | Nd | Ce | Y |
|---|---|---|---|---|---|---|
| Salt Phase | 2.64 wt % | 0.34 | 0.45 | 4.0 | 2.6 | 0.28 |
| Metal Phase | 0.84 | 0.083 | 0.063 | 0.037 | 0.013 | <0.001* |
| Dist. Coef. | 3.1 | 4.1 | 7.1 | 110 | 200 |  |
| Sep. Factors (relative to uranium) |  | 1.30 | 2.3 | 34 | 64 |  |

*conc. in metal phase below detection limit
+Am concentrations in parts per million Although the addition of plutonium metal caused the distribution coefficients to decrease, indicating that a fraction of each element had transferred from the salt into the metal phase, the separation factors for neodymium and cerium were constant within experimental accuracy.

EXAMPLES III

The distributions of curium, plutonium, americium and uranium between liquid chloride salts and liquid cadmium alloys were measured by adding about 3.0 mg of curium (about 0.009 TBq of Cm-244) in the form of the chloride to a steel crucible, at 500° C. and containing 240 g of a mixture of liquid chloride salts (38 wt % $BaCl_2$, 32 wt % $CaCl_2$, and 30 wt % LiCl) and 830 g of liquid cadmium. Dissolved in the cadmium were 1.24 g of plutonium containing americium, and 12 g of uranium.

The addition of 1.0 g of lithium metal to this crucible reduced the curium chloride almost quantitatively to curium metal, which then dissolved in the cadmium. Next, 25 g of $CdCl_2$ were added to the crucible. Stirring dissolved the $CdCl_2$ in the salt and caused it to react with the lithium, curium, plutonium, and uranium in the metal phase to form the corresponding chlorides, which dissolved in the salt. Analyses of the metal showed that 100% of the lithium originally in the metal transferred to the salt, and that the actinides distributed between the salt and metal as shown in Table 3.

TABLE 3

|  | U | Cm | Pu |
|---|---|---|---|
| Salt Phase | 9.18 g | 2.6 mg | 1.01 g |
| Metal Phase | 2.82 g | 0.40 mg | 0.23 g |
| Dist. Coef. | 10.4 | 21.0 | 14.0 |
| Sep. Factors (relative to uranium) |  | 2.0 | 1.35 |

The addition of 2.0 g of uranium metal caused a redistribution of curium, plutonium and uranium as shown in Table 4 below.

TABLE 4

|  | U | Cm | Pu |
|---|---|---|---|
| Salt Phase | 9.29 g | 2.41 mg | 0.90 g |
| Metal Phase | 4.71 g | 0.59 mg | 0.34 g |
| Dist. Coef. | 6.30 | 13.0 | 8.46 |
| Sep. Factors |  | 2.1 | 1.34 |

The added uranium metal had the effect of extracting some of the curium and plutonium from the salt and transferring them into the metal; an equivalent amount of uranium transferred into the salt. Again, the distribution coefficients changed, but the separation factors were unchanged within experimental accuracy.

The results of many experiments similar to those described in the above examples are shown in FIG. 1. The measurements show that when thermodynamic equilibrium has been established between liquid cadmium and stable chloride salts, the actinide and rare earth elements distribute between the two phases such that the rare earths favor the salt phase more strongly than the actinides. It is especially significant that in these salt-cadmium systems, americium and curium have distribution coefficients that are close to other actinides and considerably less than the rare earth coefficients so that the americium and curium can be separated from the rare earths along with plutonium.

EXAMPLE IV

In one preferred application, the extraction process treats the waste electrolyte salt from the electrorefining of discharged fuel an IFR facility having an average thermal output of 2880 MWy/y, equivalent to an annual electrical output of about 1000 MWy. The core and blanket fuels, which are metallic alloys of zirconium, are assumed to remain in the reactor for 4 years; the core fuel reaches a burnup of 110 MWd/kg of heavy metal (HM), and the blanket fuels have an average burnup of 20 MWd/kg HM. The discharge rates are 6830 kg HM/y for core fuel and 10700 kg HM/y for blanket fuels. The fuels are cooled 1 year before processing.

The electrorefining process, which has been described before will discharge about 3600 kg of salt when treating these spent IFR fuels. The discharged salt, which is a mixture of the chlorides of lithium, sodium, calcium and barium, will also contain about 8.2 g/kg of uranium and transuranic elements, about 86 g/kg of rare earth fission products, and large amounts of alkali metal and alkaline earth fission products. It will have a beta-gamma activity of about 10 Ci/g and an alpha activity of 0.5 mCi/g. FIG. 2 is a flow diagram of a proposed process for treating the IFR waste to reduce the long-lived alpha activity below the level (100 nCi/g) permitted in low-level wastes. As shown in the diagram, the total flows are weight ratios relative to the waste salt flow of 1.0, while the concentrations of individual elements are given in grams per kilogram.

As shown, the discharged electrorefining salt is contacted at about 500° C. with a liquid cadmium-uranium alloy in a multistage, countercurrent extraction device, such as a packed column or a set of centrifugal contactors. In this example, the device would have the equivalent of seven theoretical extraction stages, and one theoretical scrub stage. The waste salt enters at one end of the extraction stages, between the extraction and scrub sections, and flows out the other end of the extraction section where the liquid cadmium-uranium alloy enters. The metal alloy flows countercurrently to the salt in the extraction section, passes the salt feed point and flows through the scrub stage. In the scrub stage, a small amount of chloride salt flows countercurrently to the metal and mixes with the waste salt flowing through the extraction section. The scrub salt contains $UCl_3$, but no other actinide or rare earth chlorides.

In the extraction section of this apparatus, uranium in the extractant alloy exchanges with transuranic and rare earth elements in the salt phase. The transuranic elements are transferred from the salt into the metal phase to a greater extent than the rare earth elements. Consequently, as the waste salt flows through the extraction section, the fraction of transuranic elements transferred into the metal is larger than the fraction of rare earths. The scrub section of this apparatus serves to reduce the amount of rare earths in the product metal alloy. The uranium in the salt exchanges with transuranic and rare earth elements in metal phase.

In this particular example, the salt-to-metal weight ratio in the extraction section is 1:5 and is 1:50 in the scrub section. The extractant alloy is cadmium metal containing 2.3 wt % U, which is the solubility of uranium in cadmium at 500° C. The product metal phase from the extraction stages is scrubbed with salt containing about 2 wt % uranium as $UCl_3$. With seven theoretical extraction stages and one scrub stage, the product metal alloy, which contains nearly all of the plutonium, americium and curium fed to the process, contains less than 15% of the rare earths and negligible amounts of fission product cesium and strontium. The recovered transuranic elements in this alloy will be returned to the IFR fuel process.

The treated waste salt will contain more than 85% of the rare earth fission products and less than 0.0013% of the plutonium, 0.055% of the americium, and 0.035% of the curium in the salt discharged from the IFR electrorefining cell. With these low concentrations of alpha-emitting elements, the treated salt can be classified as a nonTRU waste, which will greatly facilitate its disposal. If necessary, the uranium in the treated salt can be separated from the fission products by other processes, e.g., electrorefining, but in most cases recovery of uranium will not be necessary because uranium is inexpensive and relatively nonhazardous.

Alternatively, the waste salt is contacted with an equal weight of extratant mtal. This will extract about 45% of the transuranic elements and less than 4% of the rare earths, contacting the salt a second time with fresh cadmium-uranium alloy will extract similar fractions of the residual transuranic and rare earth elements. A total of about 67% of the transuranic elements but less than 7% of the rare earths are transferred from the salt to the extractant by this two-step process. The uranium and transuranic element along with the small amounts of rare earths are separated from the cadmium by vaporizing the cadmium and are returned to the IFR electrorefining cell. In this example, the salt remains a TRU-contaminated waste but most of the valuable transuranic elements have been recovered for reuse. As has been shown by the preceeding discussion and examples, the process of the invention provides an effective method for dealing with the problem of recovering transuranic elements from waste chloride salts resulting from the reprocessing of irradiated nuclear reactor fuels.

The embodiment of the invention in which an exclusive property or privilege is claimed in defined as follows:

1. A process for separating transuranic values from rare earth values when said values are contained together in a molten chloride salt comprising:

contacting the molten salt with a molten extractant alloy of cadmium metal and uranium whereby the transuranic values are preferentially taken up by the extractant alloy, and separating the extractant alloy from the molten salt thereby separating the transuranic values from the rare earth values.

2. The process of claim 1 wherein the amount of uranium metal in the extractant is an amount sufficient such that after contact between the molten salt and the extractant alloy, the uranium distribution coefficient between the salt and the extractant is between 0.1 and 100.

3. The process of claim 2 wherein the molten salt also contains uranium.

4. The process of claim 3 wherein the extractant alloy contains up to about 2.3 weight percent uranium.

5. The process of claim 4 wherein the alloy is saturated with uranium.

6. The process of claim 4 wherein the temperature of the molten salt and the molten extractant alloy is from about 450° C. to about 600° C.

7. The process of claim 6 wherein the weight ratio of salt to extractant is 1:5.

8. In the process for pyrochemically reprocessing irradiated metallic zirconium-uranium-plutonium nuclear reactor fuel containing other transuranic and rare earth elements, wherein the fuel is dissolved in molten cadmium contained in a container in the bottom of an electrorefining cell, an electrode is placed in a molten chloride electrolytic salt located above the molten cadmium containing the dissolved reactor fuel, and a current is passed between the molten cadmium and the electrode whereby the most of the transuranic elements pass from the cadmium through the salt to the electrode while the rare earths pass into and remain in the salt, an improvement in the process for recovering the residual transuranic elements from the salt comprising contacting the salt with a molten extractant alloy of cadmium metal containing uranium metal in an amount up to about 2.3 weight percent, whereby the transuranic elements are preferentially taken up by the extractant, while the rare earth elements preferentially remain in the salt and separating the extractant metal from the salt thereby separating the transuranic values from the rare earth values.

9. The process of claim 8 wherein the temperature is from about 450° to 600° C.

10. The process of claim 9 wherein the weight ratio of salt to extractant is about 1:2.

* * * * *